United States Patent [19]

Meredith, Jr. et al.

[11] Patent Number: 5,990,984
[45] Date of Patent: Nov. 23, 1999

[54] COATED POLYMER SUBSTRATE WITH MATCHING REFRACTIVE INDEX AND METHOD OF MAKING THE SAME

[75] Inventors: William A. Meredith, Jr., Faribault; Bradway F. Phillips, Bloomington; Jeffrey L. Kokoschke, Fairbault, all of Minn.

[73] Assignee: Viratec Thin Films, Inc., Faribault, Minn.

[21] Appl. No.: 08/863,609

[22] Filed: May 27, 1997

Related U.S. Application Data

[63] Continuation of application No. 08/559,531, Nov. 16, 1995.
[51] Int. Cl.$^6$ .................................................. G02F 1/13
[52] U.S. Cl. .............................. 348/834; 348/835
[58] Field of Search ................... 348/834–835; 313/478–479

[56] References Cited

U.S. PATENT DOCUMENTS

| | | | |
|---|---|---|---|
| 3,458,348 | 7/1969 | Sherman | 117/38.8 |
| 3,700,487 | 10/1972 | Crandon et al. | 117/64 |
| 3,986,997 | 10/1976 | Clark | 260/29.2 M |
| 4,408,837 | 10/1983 | Kozaki et al. | 350/336 |
| 4,609,267 | 9/1986 | Deguchi | 351/163 |
| 5,015,523 | 5/1991 | Kawashima et al. | 428/336 |
| 5,181,142 | 1/1993 | Asai et al. | 359/581 |
| 5,243,255 | 9/1993 | Iwasaki | 348/835 |
| 5,281,893 | 1/1994 | Matsuda et al. | 348/834 |
| 5,473,448 | 12/1995 | Yoshinaga et al. | 359/51 |
| 5,789,476 | 8/1998 | Iryo et al. | 524/430 |

*Primary Examiner*—Thomas D. Lee
*Assistant Examiner*—Stephen Brinich

[57] ABSTRACT

An article comprising a transparent or translucent polymer substrate and a transparent or translucent coating applied thereto in which the refractive index of the coating material substantially matches the refractive index of the polymer substrate. The invention also relates to a method for making an article comprising a polymer substrate and a coating in which the refractive index of the coating substantially matches the refractive index of the polymer substrate.

25 Claims, 3 Drawing Sheets

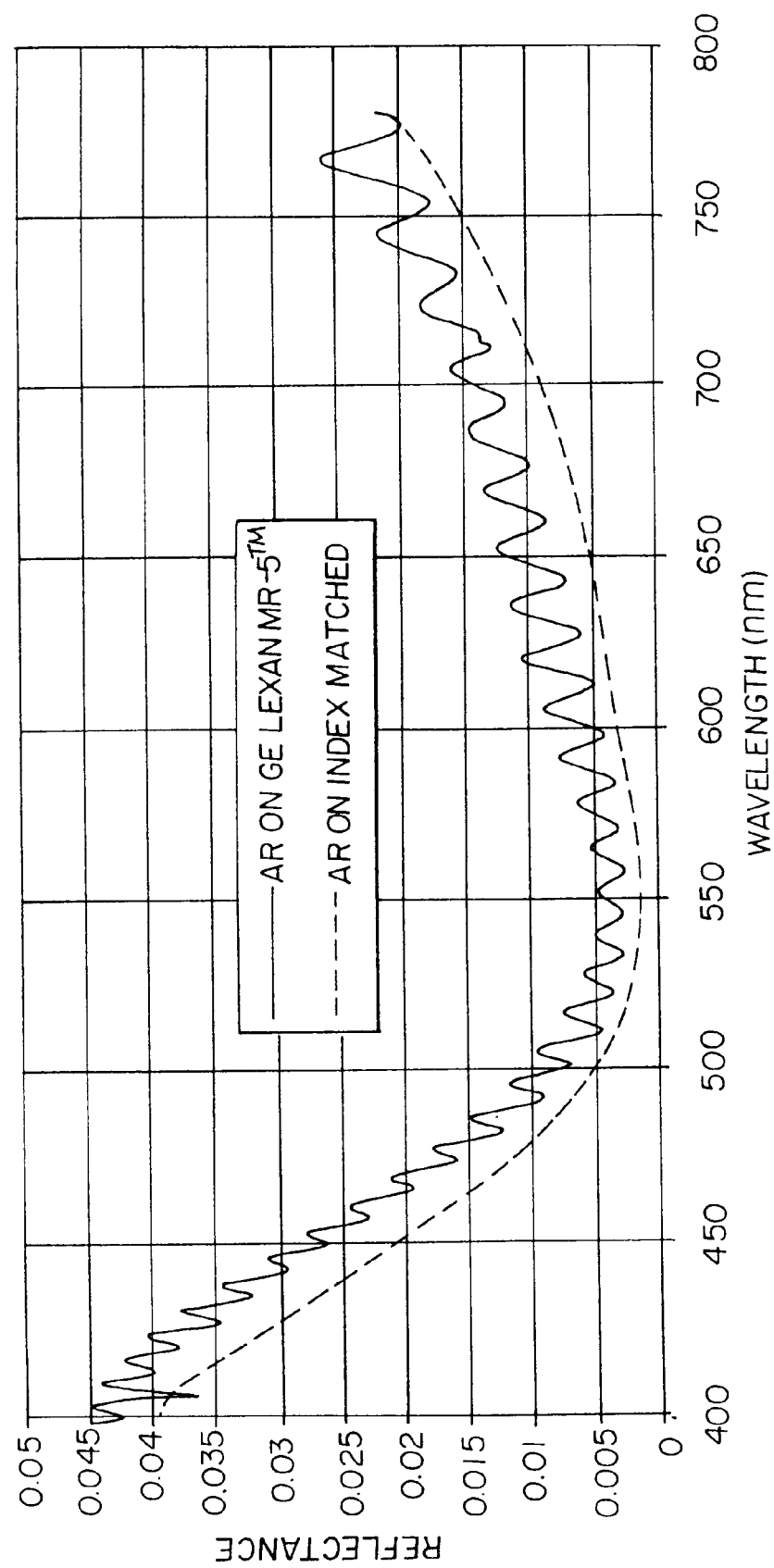

5,990,984

COATED POLYMER SUBSTRATE WITH MATCHING REFRACTIVE INDEX AND METHOD OF MAKING THE SAME

This is a continuation of application Ser. No. 08/559,531 filed Nov. 16, 1995.

BACKGROUND OF THE INVENTION

1. Field of the Invention

The present invention relates generally to a coated polymer or plastic substrate and more particularly to a polymer substrate coated with a material such as a hard coat or other abrasion resistant material in which the refractive indices of the polymer substrate and such material are substantially matched and one or more vapor deposited optical films. The present invention also relates to a method of making a coated polymer substrate in which the refractive indices of such coated layer and the polymer substrate are substantially matched.

2. Description of the Prior Art

Various optical devices, display articles or other products exist such as windows, eyeglass lenses and protective panels for computer screens, CRTs, television sets and the like in which an object is viewed through a transparent material. If the transparent material is reflective, reflected images are formed on the material, thereby disturbing vision and creating so-called ghosts or flares. These can be tiring to the eyes, particularly when the transparent material is in the form of a protective panel or screen for a computer display or CRT where the device is commonly viewed for extended periods of time.

A number of measures have been proposed for preventing or minimizing this reflection. Where the transparent material is glass, the problem has been addressed by depositing single or multi-layer anti-reflective films on the glass substrate or lens through a variety of thin film deposition techniques. More recently for reasons of weight, safety, expense, etc., glass has been replaced by various polymer materials as the transparent material in these applications. However, attempts to apply anti-reflective films directly onto the polymer or plastic substrates have created problems with film adhesion and stability. Further, the polymer substrates commonly available are relatively soft compared to glass substrates, thereby making them susceptible to scratching and abrasion. This has led to various modifications of the polymer surface to protect it from abrasion and to make it more suitable for deposition of the anti-reflective films.

One of these modifications includes providing the polymer substrate with a hard coat of abrasion resistant material comprised of a silica-loaded, siloxane-based film which not only provides a hardened coating on the surface of the plastic substrate for protection, but also provides bonding sites for the deposited anti-reflective film. Such a hard coat applied to a plastic substrate and then cured to provide an abrasion resistant coating for such substrate is disclosed in Clark U.S. Pat. No. 3,986,997. One problem not addressed in Clark, however, is the reflection occurring at the interface between the polymer substrate and the abrasion resistant material. The amount of reflection occurring at this interface is directly related to the difference between the refractive index of the substrate and the refractive index of the hard coat. Conventional siloxane based hard coats such as those described in Clark have a relatively low refractive index on the order of 1.44 to 1.46. In direct contrast polymer substrates of acrylic polymers such as polymethylmethacrylate (refractive index $n_d$=1.491), polystyrenes (refractive index $n_d$=1.590), polycarbonates such as (refractive index $n_d$=1.586) and polydiethylene glycol bisallyl carbonate (refractive index $n_d$=1.504) and many of the various other plastic substrates disclosed in Clark have relatively high refractive indices which differ significantly from that of conventional hard coats and particularly siloxane based hard coats. Many of these other substrate materials have refractive indices of about 1.50 or greater and some of about 1.60 or greater. Applying a hard coat to a polymer substrate in which the hard coat and substrate have differing refractive indices leads to the phenomenon known as interference ripple with the distortion resulting from such ripple being directly proportional to the difference in refractive indices. Interference ripple can affect the transmission of light at various points in the optical spectrum and cause reflectivity to increase by a factor of two to three times. The problem of interference ripple is addressed in Deguchi et al. U.S. Pat. No. 4,609,267 which solves the problem by vapor depositing an anti-reflective film between the plastic substrate and the silicon dioxide ($SiO_2$) hard coat.

Kawashima et al. U.S. Pat. No. 5,015,523 also discloses a hard coat applied to a polymer substrate. Specifically, Kawashima discloses a synthetic resin lens comprising a plastic substrate, an organic primer to promote adhesion, a siloxane based abrasion resistant hard coat and a multi-layer, anti-reflective film. No attempt is made in Kawashima, however, to match the refractive indices of the hard coat to the plastic substrate and the optical data disclosed in such patent evidence interference ripple in the Kawashima lens, thus decreasing its optical performance.

Accordingly, there is a need in the art for an effective abrasion resistant or other material applied to a plastic substrate in which the material and the substrate have substantially matching refractive indices to reduce or eliminate interference ripple as well as a method of making an optical device, display article or other product having a coated plastic transparent substrate exhibiting such properties.

SUMMARY OF THE INVENTION

The present invention relates to a polymer substrate coated with a material, preferably of abrasion resistant characteristics, in which the refractive index of the abrasion resistant material substantially matches that of the polymer substrate so as to reduce interference ripple and to improve optical quality. More specifically, the present invention comprises a polymer substrate and an abrasion resistant hard coat which normally have substantially differing refractive indices wherein the refractive index of the polymer substrate or the hard coat, but preferably the hard coat, is formulated to provide a refractive index which substantially matches the refractive index of the other. Most specifically the present invention comprises a polymer substrate with a refractive index of about 1.49 or greater and a silicone or siloxane based hard coat which has been formulated to exhibit a substantially matching refractive index. A further aspect of the present invention includes depositing one or more anti-reflective, electrically conductive or other films onto the abrasion resistant coating. These films may be applied by sputtering or other similar techniques for the purpose of providing further reflection reduction, static dissipation or other specific optical properties to the film and to the polymer substrate.

Accordingly, it is an object of the present invention to provide an optical device or other article having a polymer substrate and a hard coat material coated onto the substrate in which the coated layer and the substrate have substantially matching refractive indices.

Another object of the present invention is to provide a display article or the like comprised of a plastic substrate, a coating of abrasion resistant material having a refractive index substantially matching that of the substrate and one or more layers of an optical film applied to the abrasion resistant material.

A further object of the present invention is to provide a method of making an optical device or other article having a polymer substrate and a material of desired properties applied thereto in which such material and/or the substrate have been formulated to exhibit substantially matching refractive indices.

A still further object of the present invention is to provide a display article or the like having a plastic substrate with a refractive index of about 1.49 or greater and a silicone or siloxane based hard coat with a substantially matching refractive index.

These and other objects of the present invention will become apparent with reference to the drawings, the description of the preferred embodiment and the appended claims.

DESCRIPTION OF THE DRAWINGS

FIG. 6 is a graph plotting reflectance versus wavelength for the item of FIG. 5 after a multilayer anti-reflective coating was applied.

DESCRIPTION OF THE PREFERRED EMBODIMENT

The present invention relates generally to a multi-layer article having a first layer comprised of a polymer substrate and a second layer comprised of a material coated onto the polymer substrate in which the coated material has a refractive index substantially matching that of the polymer substrate so as to minimize reflectance and other visual distortion occurring at the interface between the substrate and the coated layer. Throughout the application and claims, the substrate may be referred to as a polymer or plastic substrate. Unless otherwise indicated, these modifiers are intended to have the same meaning and describe any polymeric or synthetic material. Further, in the preferred embodiment, the coated layer is a material which is an abrasion resistant material and is commonly referred to as a "hard coat". It is contemplated, however, that it may be desirable to utilize the present invention in the application of coatings other than an abrasion resistant material to a polymer substrate. Still further, it is contemplated that the present invention can be used in connection with a wide variety of optical devices or other articles embodying a polymer substrate and a coated material in which it is desirable for the substrate and the coated material to have refractive indices which substantially match one another.

Figure 1:
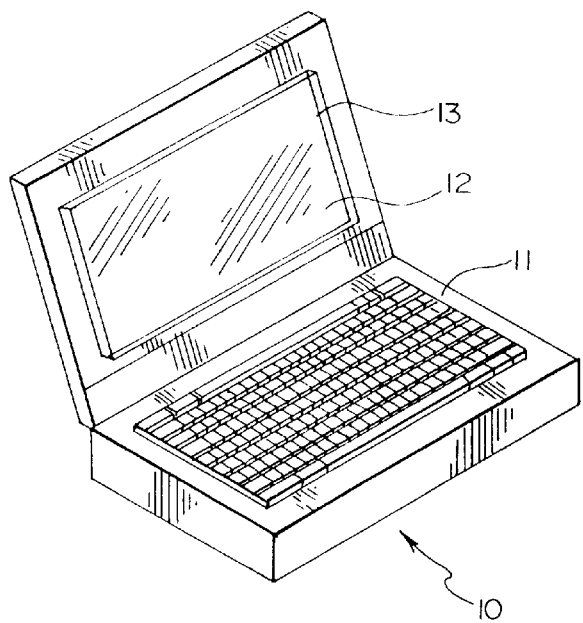
FIG. 1 is an isometric view of a flat panel display device incorporating an optical display article incorporating the present invention.

The preferred embodiment describes the present invention as used in connection with a display device or display article such as a flat panel display or a CRT. In this regard, reference is first made to FIG. 1 showing an isometric view of a flat panel display device 10 incorporating the optical article in accordance with the present invention. Specifically, the flat panel display device 10 in FIG. 1 is a laptop computer comprising a computer frame and housing 11 and an optical display item 13 having a flat panel display screen 12. In the preferred embodiment the display screen 12 is a flat or substantially flat optical article which includes a synthetic or plastic substrate, an abrasion resistant coating applied directly to the substrate and one or more layers comprising a vapor deposited film applied directly to the abrasion resistant film. As used herein, the term flat panel display device shall have the meaning of that term in the art and shall include computers, avionics, televisions, automatic teller machines, and automotive instrument panels, among others.

Figure 3:
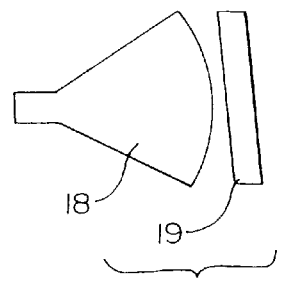
FIG. 3 is a schematic view of a CRT with a display article embodying the present invention.
Figure 4:
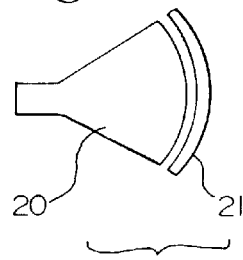
FIG. 4 is a schematic view similar to that of FIG. 3 of a CRT with an alternate embodiment of a display article incorporating the present invention.

FIGS. 3 and 4 show use of the display article of the present invention with a CRT. Specifically, FIG. 3 shows a CRT 18 with a slightly curved front face and an optical article 19 comprised of a flat plastic substrate coated with an abrasion resistant material and one or more vapor deposited anti-reflective or other films. The article 19 can be mounted to, or suspended in front of, the CRT to provide anti-reflective or other properties. FIG. 4 shows a CRT 20 and an optical article 21, however, in FIG. 4, the article 21 is slightly curved to match the curvature of the CRT. This facilitates bonding of the article 21 directly to the CRT front face.

Many applications of the article of the present invention such as the item 13 used with a flat panel display device as shown in FIG. 1, or the optical article 19 and 21 used with the CRT as shown in FIGS. 3 and 4 will be flat or substantially flat and exhibit no magnification, i.e. zero diopter. However, it is contemplated that the benefits of the present invention can be achieved and the present invention can be used with magnifying polymer substrates and polymer substrates with varying thickness such as applications for eyeglasses and photographic and other lenses. For use in the application in connection with a flat panel display or a CRT as shown, however, the article will have a substantially uniform thickness throughout ranging from about 0.025 to about 3.5 millimeters.

Figure 2:
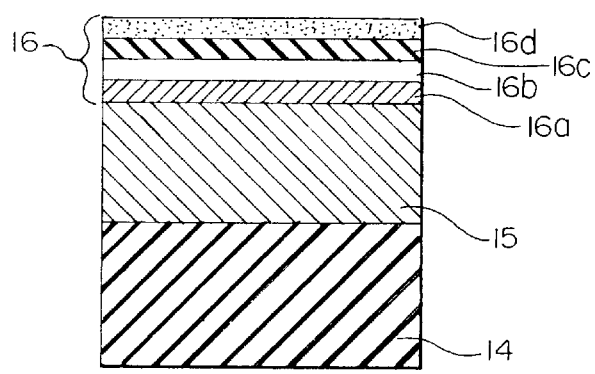
FIG. 2 is a sectional view illustrating a surface portion of an optical article or other device of the present invention and specifically illustrating the polymer substrate, the abrasion resistant or other coating applied thereto and the vapor deposited film comprised of one or more separate layers.

With reference to FIG. 2, the article of the present invention includes a polymer or plastic substrate 14, a coating of desired property such as an abrasion resistant coating 15 applied to and adhered directly to the substrate 14 and one or more layers 16a–16d of a vapor deposited film 16 applied directly to the abrasion resistant coating 15. The layers 16a–16d are preferably optical interference layers, electrically conductive layers or a mixture thereof, although other functional layers can be provided as well. The details of these components in the article of the present invention are described in greater detail below.

The Polymer Base Material

The polymer material used as the substrate 14 for the article of the present invention can comprise a variety of plastic materials. Preferably, the material is transparent or translucent. Any polymer may be used for this substrate but preferred examples include polydiethylene glycol bisallyl carbonate resins, polycarbonate resins, polymethyl methacrylate resins or the like. Preferably the materials for which the present invention are most applicable are those materials having relatively high indices of refraction, specifically those having a refractive index greater than the normal refractive index of the coated material and more specifically, a refractive index greater than the refractive index of the preferred silicone or siloxane based hard coats which typically have refractive indices in the range of 1.44 to 1.46. Accordingly, the present invention is particularly applicable to substrates such as those having an index of refraction of about 1.49 or greater, more preferably of about 1.55 or greater. Still greater benefits will be achieved with substrates having a refractive index of 1.60 or greater. Polymer materials which fall within these categories of high refractive index materials include those identified above. The substrate may be formed by extrusion, casting, molding or any other suitable means of fabrication for plastic.

The polymer substrate does not have any thickness limitations although when used in a flat panel display or with a CRT, the thickness of the substrate will normally range from 0.25 to 3.5 mm and will be substantially uniform throughout. When used in the manufacture of eyeglasses or other lenses, the thickness will generally be non-uniform. In either application, the material and the thickness should be such that the substrate is substantially transparent at the relevant thickness.

Specific materials useful in accordance with the present invention as the polymer substrate include polydiethylene glycol bisallyl carbonate resins which have a nominal refractive index of $n_d=1.504$. These resins are widely used in the manufacture of lenses for the ophthalmic industry and are commonly available from Pittsburgh Plate Glass under the trademark CR-39. Polycarbonate resins having a nominal refractive index of $n_d=1.586$ are also applicable as the polymer substrate in accordance with the present invention. These resins are widely used as flat sheets in lenses because of the their resistance to impact damage, but normally need to be provided with an additional hard coat because of the relative softness of their surface and the susceptibility to scratching. One form of this material is available from General Electric under the trademark Lexan.

The Coated Material

The material of the layer 15 (FIG. 2) to be coated onto the polymer substrate 14 can comprise various materials, depending upon the particular property of the coating material which is desired. Commonly, the coating 15 is an abrasion resistant or hard coat layer applied to the polymer substrate 14 to protect the substrate 14 against abrasion and the like. The material of the coating 15 is preferably a material suitable for bonding to the polymer substrate 14 and which is also suitable for increased bonding strength with the subsequently applied inorganic vapor deposited film 16. Thus, the abrasion resistant material forming the coating 15 should preferably embody sufficient organic character to facilitate bonding to the organic polymer substrate directly, without pretreatment of the substrate surface, but should also embody sufficient inorganic character to provide improved bonding between such material and the vapor deposited inorganic film.

A further characteristic of the coated layer 15 in accordance with the present invention is that it be transparent or translucent at the relevant thicknesses and have a refractive index which has been adjusted to substantially match the refractive index of the polymer substrate 14 to which it is applied. As used herein, the term "substantially match" shall mean refractive indices which vary from one another by no more than about 0.05, more preferably by no more than about 0.03 and most preferably by no more than about 0.015.

The preferred coated material is an abrasion resistant coating comprised of a silicone based, and more specifically a polysiloxane based, material which is filled with a mixture of various inorganic particles to obtain the desired abrasion resistance. Conventional abrasion resistant materials such as the above mentioned siloxane based materials have a relatively low refractive index of about 1.46 or lower. Because of this, conventional hard coats such as the preferred polysiloxane based coatings lead to interference ripple when applied to most of the desired substrates which have refractive indices of about 1.49 or greater.

The preferred coating material of the present invention is a polysiloxane based material which is filled with a mixture of various inorganic materials to provide it with the desired abrasion resistance and various high refractive index components such as titanium dioxide sol of the preferred embodiment to provide it with desired refractive index.

Because the commonly applied hard coats, and particularly the polysiloxane based hard coats, typically have relatively low refractive indices, it is necessary, in accordance with the present invention, to formulate the hard coat with an elevated refractive index so that it substantially matches the refractive index of the polymer substrate. The refractive indices of commonly used substrates, typically 1.49 or higher, are high compared to that of the siloxanes. The higher the refractive index of the substrate, the greater the difference between the refractive indices of the substrate and preferred siloxane based hard coat, and thus the greater the distortion resulting from interference ripple.

It is contemplated that a variety of techniques may be utilized to prepare and formulate the hard coat so that it exhibits the desired refractive index when applied to the substrate. One technique in accordance with the preferred embodiment is to prepare the hard coat by first mixing an organo functional titanate or zirconate with an amino functional organo siloxane followed by mixing the resulting reaction product with a glycidoxy functional organo silane and then hydrolyzing the same via the addition of water.

More specifically, the present invention involves mixing an organo functional titanate such as tetraisopropyl titanate with an amino functional organo siloxane. These compounds are combined in their liquid forms, at room temperature, to allow the same to react. During such reaction, the amine groups combine with the titanium to form an organo metallic chelate. Although the preferred embodiment utilizes tetraisopropyl titanate, it is contemplated that various other organo functional titanates, zirconates or other materials may be utilized such as butyl propyl titanates or tetrapropyl zirconates.

After the reaction of the initial ingredients is substantially complete, with the amine groups forming a chelate with the titanium, the reaction product is mixed with a glycidoxy functional organo silane at room temperature followed by the addition of a mixture of water and alcohol to hydrolyze the titanium to titanium dioxide sol and the alkoxy groups on the silicon to silanols. This mixture is allowed to stand for several hours until the hydrolysis is complete.

The resulting mixture which forms the basis for the coating material is comprised of, among other components, siloxanes which have a relatively low refractive index in the range of 1.44 to 1.46 such as is found in conventional polysiloxane coatings and titanium dioxide sol which has a relatively high refractive index in the range of approximately 2.8. The presence of this high refractive index component results in an abrasion resistant coating having a refractive index which is elevated from the normally low refractive index of conventional polysiloxane coatings. Through experimentation and testing, it has been determined that the relationship between the amount of titanate and the amount of siloxanes in the composition results in a relatively straight line relationship to the refractive index of the composition.

A further technique of formulating the hard coat to exhibit the desired refractive index is to provide a conventional hard coat such as a siloxane based hard coat with high refractive index particles. Specifically, a siloxane based hard coat composition may comprise a mixture of a colloidal dispersion of high refractive index inorganic particles carried in a vehicle comprised of a dispersion of colloidal silica in a lower aliphatic alcohol-water solution of the partial condensate of a silanol of the formula $RSi(OH)3$ in which R is selected from, but is not limited to, the group of aliphatic radicals of from 1 to 3 inclusive carbon atoms with a small fraction of a derivatized silane including functional groups such as epoxy, acryl, etc. added to improve adhesion to the polymer substrate. The ration of the colloidal silica particles to the colloidal dispersion of the high refractive index particles is adjusted to make the refractive index of the dried, fully reacted film substantially match that of the polymer substrate. High refractive index particles suitable for use in such technique can be, but are not limited to, $ZrO_2$, $Al_2O_3$, $CeO_2$, $TiO_2$ and $Ta_2O_5$.

It is contemplated that various hard coats other than the preferred siloxane based hard coats may be used in the present invention and that various techniques other than those disclosed above may be utilized for formulating the hard coat to exhibit a desired refractive index substantially matching that of the polymer substrate. The hard coat in accordance with the present invention is preferably applied to the substrate in its liquid form and is thus based on aqueous or organic liquid based chemistry. The hard coat may be applied to the substrate by spraying, flowing, dipping, spinning or any other method known in the art for applying liquid based films and coatings.

Figure 5:
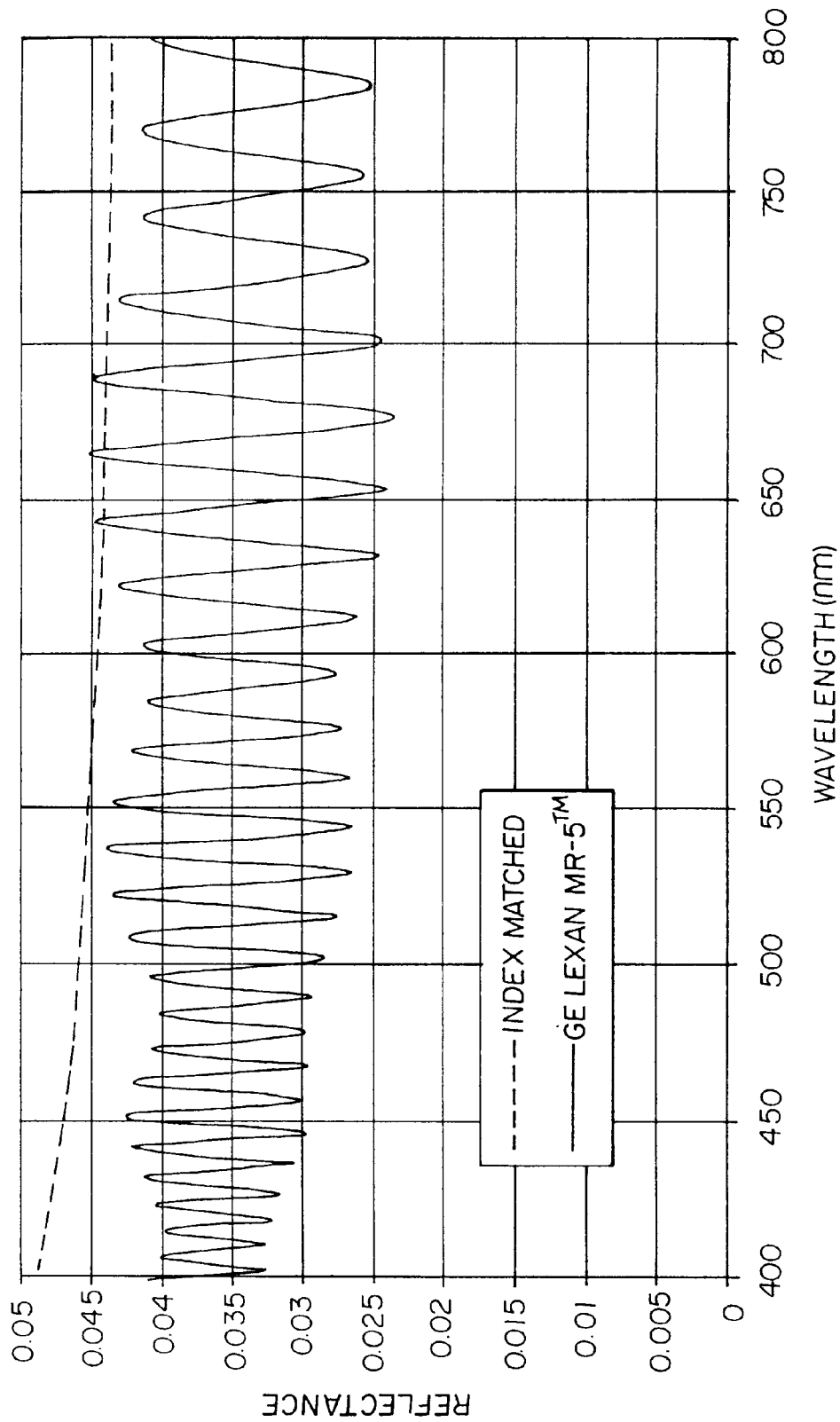
FIG. 5 is a graph plotting reflectance vs. wavelength for a conventional hard coat (GE's Lexan MR-5) and a hard coat in which the refractive index has been substantially matched in accordance with the present invention.

FIG. 5 is a graph comparing optical performance of a conventional hard coated polycarbonate from General Electric (GE Lexan MR-5) with that of a Lexan polycarbonate substrate coated with refractive index matching hard coat in accordance with the present invention. Both specimens of FIG. 5 were comprised of 0.060 inches thick polycarbonate substrate, with hard coats of about 5 microns applied to the substrate surface. In FIG. 5, the solid line represents the conventional, unmatched GE Lexan MR-5 product. The interference ripple seen on this product is due to both the difference in index of refraction between the hard coat and the substrate and the variation in thickness of the hard coat within the analyzed area. The polycarbonate substrate with a matching refractive index hard coat in accordance with the present invention is represented in FIG. 5 by the broken line. Because there is no appreciable difference in refractive indices between the substrate and hard coat, interference ripple is eliminated and all that is seen is the simple reflection of light from the surface of the hard coat.

FIG. 6 is a graph similar to that of FIG. 5 comparing optical performance of the coated substrates of FIG. 5 with an anti-reflective (AR) film deposited thereon. The AR film in both case was a six layer, partially conductive anti-reflective structure comprised of multiple metal oxides and nitrides. As can be seen, the product coated in accordance with the present invention improves upon the performance of GEMR-5 Lexan by providing an optical item with less overall reflectivity and elimination or substantial reduction of oscillations in reflectivity. This has the effect of reducing both the overall glare and the "ghosting" in the viewed image.

The Vapor Deposited Films

The vapor deposited film 16 applied to the coated layer 15 can comprise any vapor deposited optical interference and/or electrically conductive film capable of bonding to the coating 15. Such films and the vapor deposition process of applying them are well known in the art. Normally, such films comprise one or more vapor deposited layers of inorganic materials. Such materials may be electrically conductive, if desired, for use in certain applications to dissipate static or may function solely as optical interference layers. The preferred film, however, will comprise a plurality of vapor deposited layers which will provide the film 16 with high performance anti-reflective properties. Preferably the film will range in thickness from about 50 nm to about 5 microns, with each individual layer ranging about 10 nm to 200 nm.

The preferred methods of depositing these films 16 onto the coated layer 15 may include evaporation, RF or DC sputtering, chemical vapor deposition, metal mode reactive sputtering or any other method of depositing high performance optical interference films.

Method

In addition to the method steps inherent in the above description, the method of the present invention includes providing a transparent or translucent polymer substrate having a known refractive index and providing a transparent or translucent material for coating onto the polymer substrate in which such coating has been formulated to exhibit a refractive index substantially matching that of the polymer substrate and is preferably applied in a liquid form. The method also preferably includes applying one or more layers of a vapor deposited film to the coated layer to provide desired optical properties.

Although the description of the preferred embodiment and the method has been quite specific, it is contemplated that various modifications could be made without deviating from the spirit of the present invention. Accordingly, it is intended that the scope of the present invention be dictated by the appended claims rather than by the description of the preferred embodiment.

We claim:
1. A mulilayer optical device comprising:
   a polymer substrate having a thickness dimension at which said substrate is transparent or translucent and first and second spaced surfaces, said first and second surfaces being generally perpendicular to the direction in which said thickness dimension is measured and extending continuously throughout its entirety, said substrate being conducted of a polymer material having a known refractive index and known abrasion resistant properties and
   a first layer of a coating material different than said polymer material applied to said first surface of said polymer substrate throughout substantially the entirety of said first surface, said coating being substantially parallel to said substrate and perpendicular to the direction in which said thickness dimension is measured and forming a substrate/coating interface between said substrate and first layer, said coating material being transparent or translucent at the applied thickness, being an abrasion resistant coating material and more abrasion resistant than said polymer substrate, and exhibiting a refractive index that substantially matches the refractive index of said polymer material.

2. The optical device of claim 1 including at least one vapor deposited anti-reflective film applied to said first layer.

3. The optical device of claim 1 wherein said abrasion resistant material includes a dispersion of high refractive index particles.

4. The optical device of claim 1 wherein said first layer is a silicone based hard coat.

5. The optical device of claim 4 wherein the refractive index of said substrate and the refractive index of said hard coat deviate from one another by not more than 0.03.

6. The optical device of claim 1 wherein said substrate has a refractive index of 1.50 or greater.

7. The optical device of claim 6 wherein said substrate has a refractive index of 1.55 or greater.

8. The optical device of claim 6 wherein said first layer is a silicone based hard coat.

9. The optical device of claim 8 including at least one anti-reflective film applied to said hard coat.

10. The optical device of claim 1 being one of a flat panel display or a CRT.

11. The optical device of claim 1 including at least one optical film applied to said first layer.

12. The optical device of claim 1 wherein said first layer has the same refractive index throughout the entirety of said layer.

13. The optical device of claim 1 including an anti-reflective film applied to said first layer.

14. The optical device of claim 1 being free of any applied voltage.

15. The optical device of claim 1 wherein interference ripple at said substrate/coating interface is reduced.

16. The optical device of claim 1 wherein said substrate includes a view side from which said substrate is intended to be viewed, said view side being generally parallel to said substrate/coating interface.

17. A method of making an optical device comprising the steps of:
   providing a polymer substrate with a thickness dimension rendering said substrate transparent or translucent, said substrate extending continuously throughout its entirety and having a viewing surface being generally perpendicular to the direction in which the thickness dimension is measured from which said substrate is intended to be viewed and a known refractive index;
   formulating and preparing an abrasion resistant coating material which when applied to said substrate exhibits a refractive index which substantially matches said known refractive index; and
   applying said coating material to the entire viewing surface of said polymer substrate, so that said coating material extends continuously throughout the entire viewing surface of said substrate and is parallel to said viewing surface, wherein interference ripple at the interface between said viewing surface and said coating material is reduced.

18. The method of claim 17 wherein said abrasion resistant material is a siloxane based hard coat.

19. The method of claim 18 wherein the refractive indices of said substrate and said hard coat deviate from one another by no more than 0.05.

20. The method of claim 19 wherein the refractive index of said substrate is 1.50 or greater.

21. The method of claim 20 wherein the refractive index of said substrate is 1.55 or greater.

22. The method of claim 18 wherein said optical article is one of a flat panel display or a CRT.

23. The method of claim 17 including the step of applying one or more layers of an optical film to said coating material.

24. The method of claim 17 wherein said step of formulating and preparing a coating material includes formulating and preparing a liquid coating material.

25. The method of claim 24 including applying the liquid coating via one of spraying, flowing, dipping and spinning.

* * * * *